United States Patent [19]
Hua

[11] Patent Number: 5,790,389
[45] Date of Patent: Aug. 4, 1998

[54] CONSOLIDATED SOFT-SWITCHING AC/DC CONVERTERS

[75] Inventor: Guichao Hua, Blacksburg, Va.

[73] Assignee: Virginia Power Technologies, Inc., Blacksburg, Va.

[21] Appl. No.: 657,615

[22] Filed: May 31, 1996

[51] Int. Cl.⁶ .................................................. H02M 3/335
[52] U.S. Cl. .................................................. 363/20
[58] Field of Search .................................. 363/15, 16, 20, 363/21

[56] References Cited

U.S. PATENT DOCUMENTS

| 4,812,960 | 3/1989 | Sakamoto et al. | 363/20 |
| 5,115,185 | 5/1992 | Fraidlin et al. | 323/207 |
| 5,301,095 | 4/1994 | Teramoto et al. | 363/21 |
| 5,331,534 | 7/1994 | Suzuki et al. | 363/20 |
| 5,508,904 | 4/1996 | Hara | 363/21 |

OTHER PUBLICATIONS

"Integrated High Quality Rectifier–Regulators", IEEE Power Electronics Specialists Conference, 1043–1051, 1992.

"A New Family of Single-Stage Power–Factor Corrections with Fast Regulation of the Output Voltage", IEEE Power Electronics Specialists Conference, 1137–1144, 1994.

"A High–Power–Factor Buck Converter", IEEE, NTT Interdisciplinary Research Laboratories, 1992.

Primary Examiner—Matthew V. Nguyen
Attorney, Agent, or Firm—Charles A. McClure

[57] ABSTRACT

A family of consolidated soft-switching AC/DC PFC converters, for power supplies and related uses. Any of several effective circuitry designs is interposed from an intermediate node on a rectified positive lead to a preselected intermediate node operative as a high-frequency AC source in a DC/DC conversion stage. Features so optimizable, individually or in combination, include power factor, regulation, and efficiency, plus reduction in circuit complexity.

16 Claims, 9 Drawing Sheets

CONSOLIDATED SOFT-SWITCHING AC/DC CONVERTERS

TECHNICAL FIELD

This invention relates to soft-switching AC/DC converters with their circuitry consolidated from multiple stages into simpler form, with greater versatility and less distortion of their AC line power.

BACKGROUND OF THE INVENTION

A conventional AC/DC power supply with capacitive rectification may constitute an AC/DC rectifier stage followed by a separate DC/DC converter stage. The AC/DC stage often has characteristically low power factor (e.g., 0.65), and distorts the AC line current—to the possible detriment of electrical equipment upstream—while also limiting the availability of power downstream from the power supply.

Conventional methods of restoring AC current and voltage to substantial congruity (nearing an ideal power factor of 1.00) by means of a power factor correction (PFC) stage located between a rectifier stage and an isolating and regulating DC/DC stage often proved too bulky, costly, and inefficient to be practical for use as desired. Whereas development of soft-switching power supplies began strongly in the decade of the 1980's and has continued apace, single-stage consolidation of PFC correction began in earnest in the 1990's. Some such designs have, and others have not, appeared in patents.

Fraidlin, Slack, and Wadlington in U.S. Pat. No. 5,115,185 (1992) "Single Conversion Power Factor Correction Using SEPIC Converter", disclose an AC/DC design with good power factor but low-frequency ripple in the output voltage and slow transient response, good only for a few applications.

Madigan, Erickson, and Ismail in their 1992 PESC Record article "Integrated High Quality Rectifier-Regulators" described so-called BIFRED (& BIBRED) designs of very good power factor and regulation, but not so good efficiency—and nearly as bulky as earlier designs.

Teramoto, Sekine, and Saito in U.S. Pat. No. 5,301,095 (1994) "High Power Factor AC/DC Converter" teach a PFC corrective lead with a sole high-frequency capacitor, but their primary diode undergoes hard switching unsuited to high-frequency operation; input and load ranges are unduly narrow without extensive frequency modulation.

Redl, Balogh and Sokal in their 1994 PESC Record article "A New Family of Single-Stage Power-Factor Correctors with Fast Regulation of the Output Voltage" teach a PFC correction with a sole diode, but because of its deep discontinuous conduction the design imposes high switching stresses, takes a large EMI filter, and is very bulky.

Better consolidation of AC/DC & DC/DC functions is needed yet.

SUMMARY OF THE INVENTION

A primary object of the present inventions is to improve power factor correction (PFC) in soft-switching AC/DC power supplies.

Another object of this invention is to combine PFC improvement with improvement in other aspects of soft-switching power supplies.

A further object of the invention is to provide a set of AC/DC soft-switching converters with consolidated or single-stage design.

Yet another object is to provide AC/DC converter design variations to accommodate diverse goals in suitably optimized designs, including also overall efficiency and tight output regulation.

A still further object of the invention is to achieve foregoing objects economically rather than with complex and costly circuitry.

In general, the objects of this invention are accomplished by intermediate interconnection, including a modified intermediate (or PFC) lead, from a conventional AC/DC rectifier having LC-filtered output to a conventional transformer-coupled DC/DC converter having a node enabled as a high-frequency AC-voltage source. Such PFC lead preferably connects a given node, as between a filter inductor and a steering diode in the positive output lead from the rectifier to the latter node, adjoining a power switch drain and optionally within a connecting input winding of the converter coupling transformer.

Such PFC lead preferably contains a capacitor or a diode, while another inductor is either series-connected with it in that lead or is series-connected from the given node to the positive lead diode. The rectifier may be of substantially any conventional type, such as boost, buck, buck-boost, Cuk, flyback, forward, SEPIC, or Zeta.

Other objects of this invention, together with methods and means for attaining the various objects, will become apparent from the following description and the accompanying diagrams of at least one embodiment, presented by way of example rather than limitation.

DESCRIPTION OF THE INVENTION

Figure 1A:
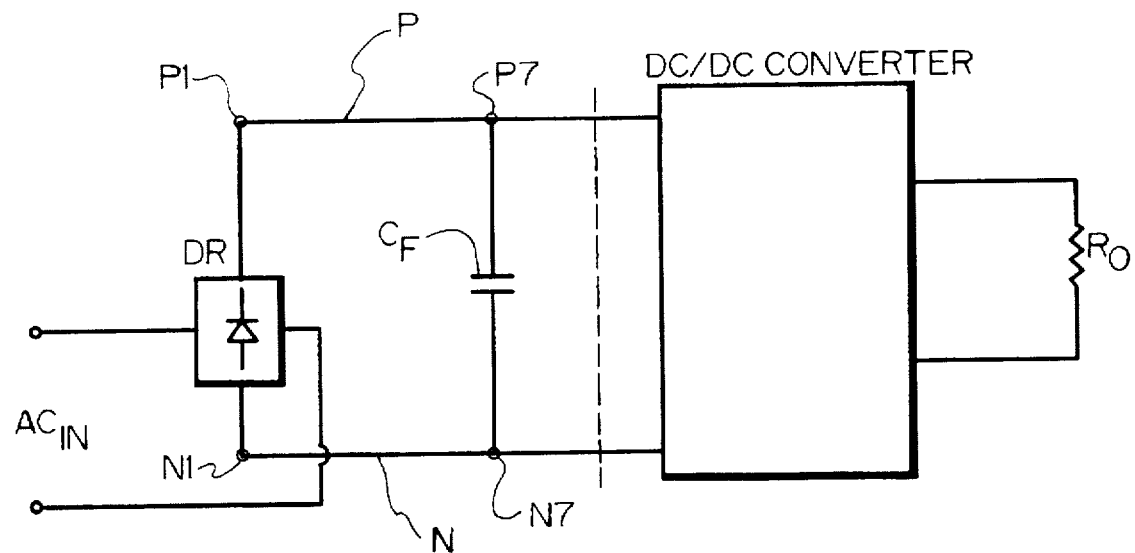
FIGS. 1A and 1B are schematic circuit diagrams of respective early and more recent prior art embodiments, each having an AC/DC rectification stage to the left and a DC/DC conversion stage to the right of a (dotted) vertical line of demarcation.
Figure 1B:
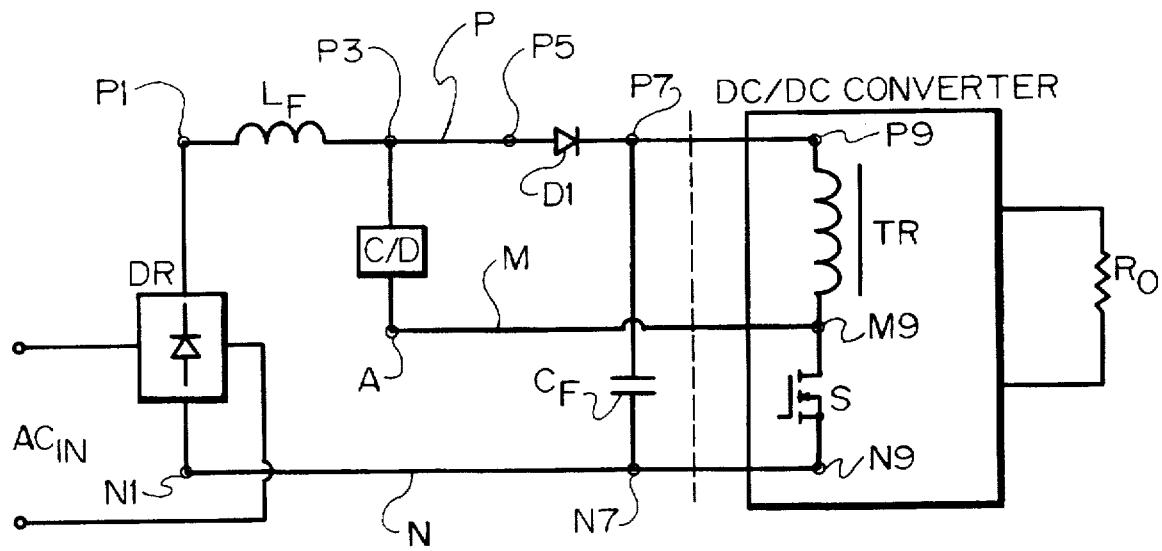

FIGS. 1A and 1B show schematically relatively early (FIG. 1A) and more recent (FIG. 1B) PRIOR ART AC/DC circuit diagrams divided figuratively—by a broken vertical line—into AC/DC diode rectifier (DR) stage (left) with pair of input terminals $AC_{IN}$ (far left), and DC/DC converter stage (right) with load resistor Ro bridging DC output terminals (far right), across which final DC output voltage $V_{OUT}$ appears during operation.

The rectifier and converter stages are interconnected, both in the prior art shown here and in subsequent views of representative embodiments of my present invention by (horizontal) upper or positive lead P and lower negative (or neutral) lead N. These two leads function both as rectifier output leads at the left, and as converter input leads at the right, of the demarcation line. Nodes on these leads are designated numerically, rightward from the rectifier (at left) terminals P1 and N1. Only some nodes will be marked in a single view, depending on whatever connections are considered there.

Early PRIOR ART FIG. 1A shows conventional filter capacitor $C_F$ bridging the positive and negative leads at respective nodes P7 and N7 just left of the demarcation line. The leads enter the converter stage (right) without further node designation in this view.

More recent PRIOR ART FIG. 1B shows filter inductor $L_F$ at the left, between nodes P1 and P3, and shows (at the right) principal diode D1, between nodes P5 and P7. Respective positive and negative leads P and N terminate in nodes P9 and N9, at the conversion stage input terminals. Also shown is an added intermediate (PFC) lead M connected downward from node P3, and containing C/D outlined by a box (indicating either the Teramoto capacitor or the Redl diode). This added lead also contains node A and proceeds rightward from it to converter stage DC/DC (contents shown only fragmentarily) where it connects to node M9, between an inductor, such as a primary winding of transformer TR, whose upper end is at node P9, and a high-frequency power switch S, whose lower end is at node N9. The rest of the converter stage is omitted as unnecessary to this view.

Structural and functional distinctions of my invention over the prior art are described below with reference to the following views.

Figure 2:
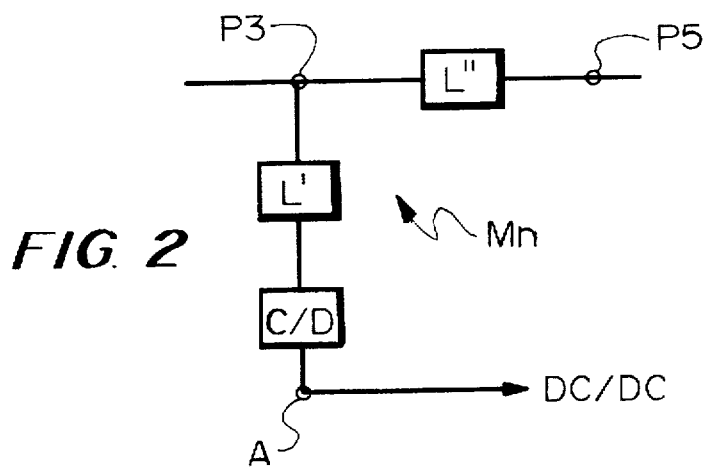
FIG. 2 is a diagram of a general embodiment of this invention having added circuitry, with circuit elements indicated in block form, and including an intermediate lead to converter circuitry.

FIG. 2 shows schematically a similarly generalized embodiment of my present invention, differing from FIG. 1 by replacing previous intermediate lead M with enhanced intermediate lead circuitry: Mn (n=1 to 4) shown with inductor L1 either bridging adjacent nodes P3 and P5 (where it is designated as L1") or connected at one end to P3 and (designated as L1') and at its other end to C/D (as in FIG. 1). Lead M contains additional node A, from which arrow points rightward to the converter (without indicating specific termination) where it is connected to a node that behaves as a high-frequency AC voltage source, such as the drain of switch S or a transformer tap. The next set of diagrams shows four possible M circuit embodiments.

Figure 3A:
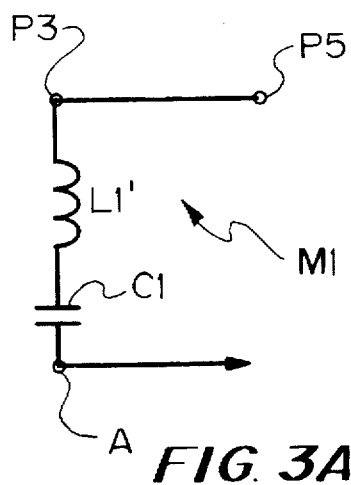
FIGS. 3A, 3B, 3C, and 3D are detailed circuit diagrams of four embodiments of the intermediate circuitry and lead of FIG. 2.
Figure 3B:
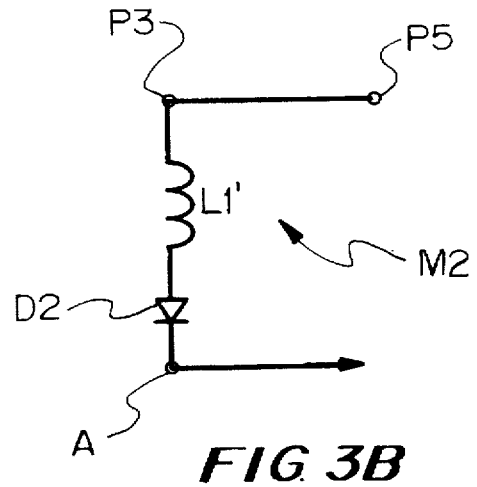
Figure 3C:
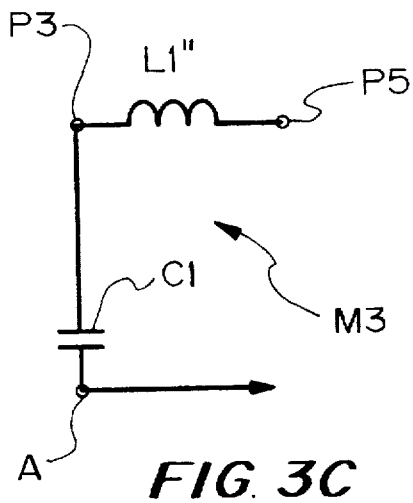
Figure 3D:
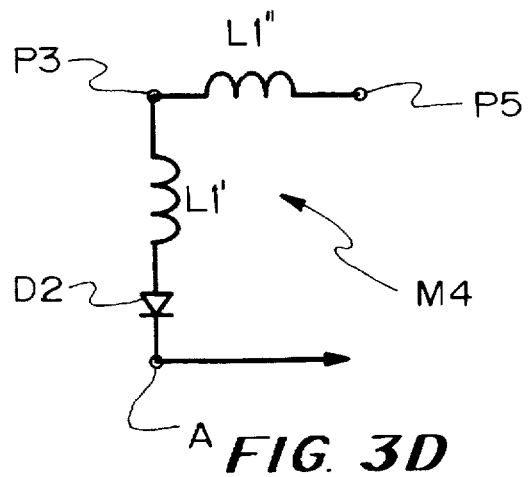

FIGS. 3A, 3B, 3C, and 3D show schematically four main examples of intermediate lead circuitry indicated generally as Mn in FIG. 2. In FIG. 3A, lead M1 connects inductor L1' (L1 single-prime position) in series from node P3 to capacitor C1 and on to additional node A. In FIG. 3B, lead M2 contains diode D2 substituted for capacitor C1 in series with inductor L1' from node P3. In FIG. 3C, lead M3 has inductor L1" (L1 double-prime position) bridging nodes P3 and P5, whereas capacitor C1 is connected from node P3 to node A. In FIG. 3D, lead M4 has inductor L1" bridging nodes P3 and P5, while diode D2 is connected from node P3 to node A. Allocation of inductor L1 in part to its positive in-line (L") position of FIGS. 3A and 3B (in series with principal diode D1), and in part to its intermediate inlead (L') position of FIGS. 3C or 3D (in series with capacitor C1 or diode D2), is optional, but may be too costly a variant to justify.

Figure 4:
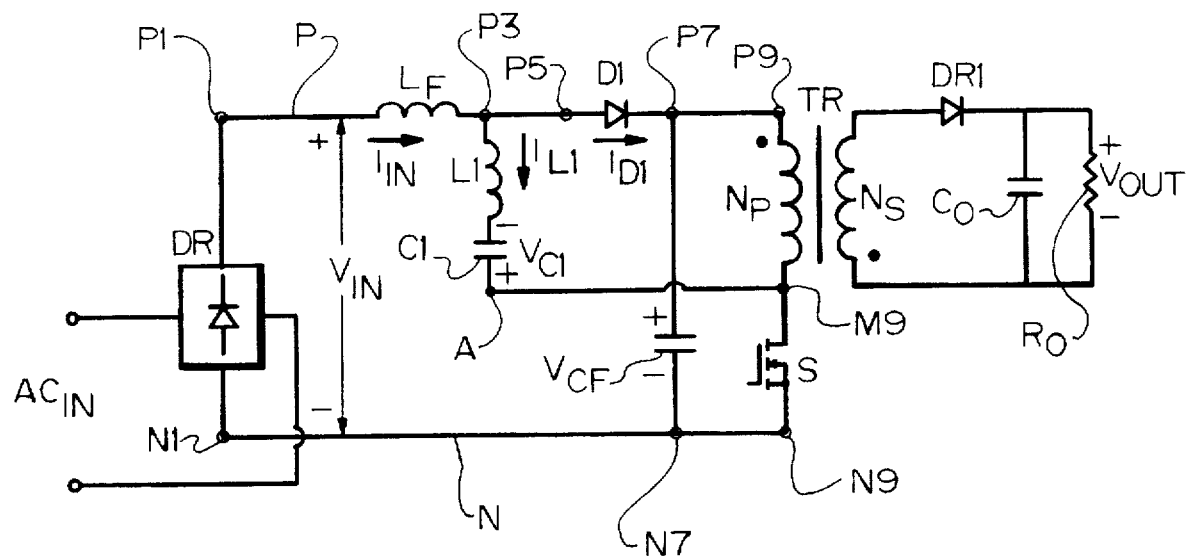
FIG. 4 is a detailed diagram of a first embodiment, corresponding to FIGS. 2 and 3A, exemplified with a converter of flyback type.

FIG. 4 shows in schematic detail a first full embodiment of the invention, corresponding to FIGS. 2 and 3A, including a converter of flyback type, in which isolation transformer TR primary winding $N_P$ connects from positive node P9 to node M9 of intermediate lead M, while reverse-wound secondary winding $N_S$ provides converter input to standard flyback converter components, including rectifying diode DR1 in the positive lead, and output filter capacitor Co bridging both leads in parallel with output or load resistor Ro. Intermediate lead M1 contains further inductor L1 in series with DC-blocking capacitor C1, and connects from its nominal end-point A to same intermediate node M9, to which high-frequency power switch S also connects from negative node N9.

Figure 5:
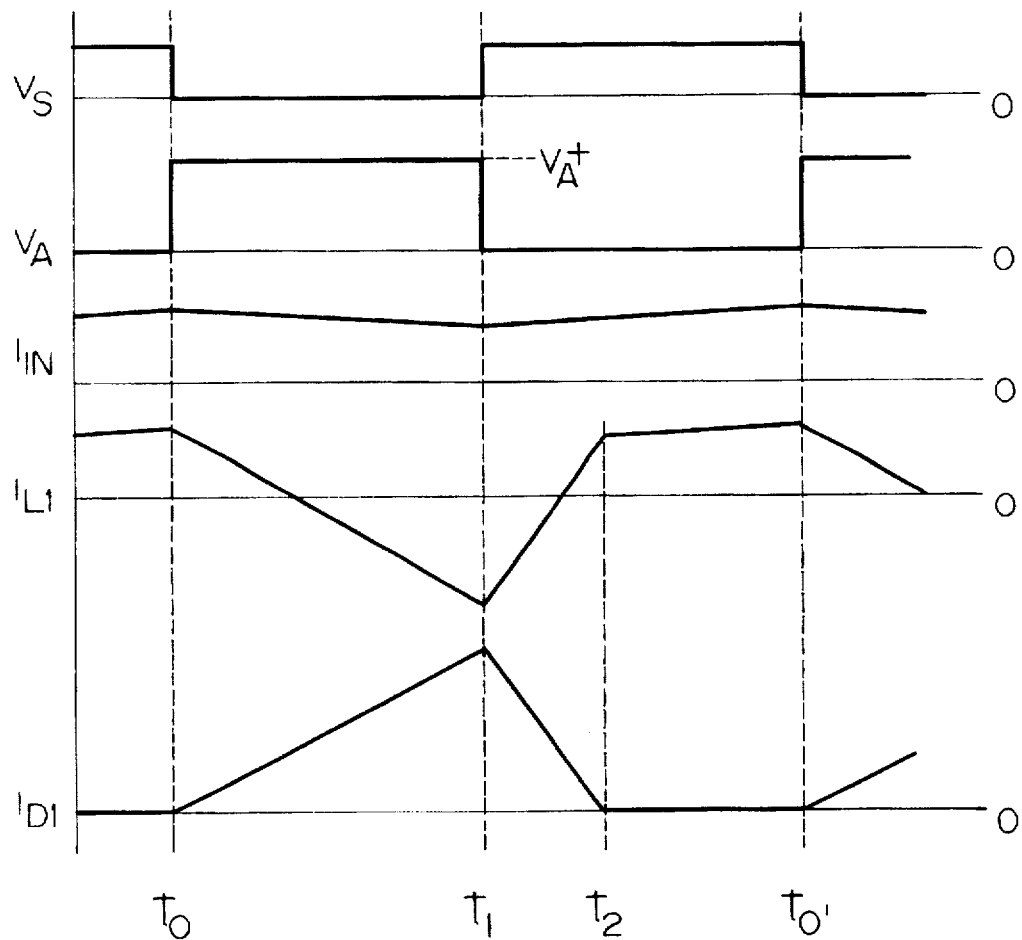
FIG. 5 is a graphical representation of internal operating voltages and currents in the FIG. 4 circuit over a switching cycle.

FIG. 5 graphs key waveforms for the circuitry of FIG. 4 over an entire soft-switching cycle of three distinct topological stages. The following voltages and currents (listed top to bottom) are shown: gate control voltage, $V_S$, for power switch S; $V_A$ the voltage available at nominal end-point A of the intermediate lead; rectified input current $I_{IN}$ via $L_F$; intermediate lead inductor current $I_{L1}$; and positive lead diode current, $I_{D1}$. Filter capacitor $C_F$ is assumed large enough to be considered a constant-voltage source, $V_{CF}$, over the line cycle. Before t0, input current $I_{IN}$ is at a moderate level; current $I_{L1}$ through the intermediate lead inductor is also at a moderate positive value, and current $I_{D1}$ through diode D1 and primary winding $N_P$ is nil. High-frequency switch S is ON, and $V_A$, the voltage at node A, is tied to zero by the switch. At time t1, S turns OFF, $V_A$ rises to $V_{CF}$ plus $V_O$ times the transformer primary-to-secondary turns ratio, $N_{P/S}=N_P/N_S$.

There are three topological stages: [t0-t1], [t1-t2], [t2-t0'], in the functioning of this embodiment of the present invention.

[t0-t1]: At time t0, power switch S is switched OFF; $V_A$ rises very rapidly from zero to substantial positive value $V_A^+$. $C_F$ is usually large enough to be deemed a constant-voltage (DC) source over the line cycle. $I_{D1}$, the current through diode D1, ramps upward to a positive peak during this time interval, and $I_{L1}$, the current through inductor L1, ramps downward to and through zero to its most negative value, reached at time t1.

[t1-t2]: At t1, switch S is turned ON, dropping voltage $V_A$ to zero. D1 is still conducting, but $I_{D1}$ is now decreasing faster than it rose, and $I_{L1}$ is increasing similarly, at a rate of $(V_{CF}+V_{C1})/L1$. At time t2, D1 current reaches zero, and D1 becomes reverse-biased.

[t2-t0'] D1 is off during this interval. $L_F$ and L1 are being charged by voltage $(V_{IN}+V_{C1})$. At t0', switch S is again turned off, and the switching cycle repeats ad infinitum.

The D1 waveform indicates that diode D1 inherently undergoes zero-current switching, owing to the presence of L1. Its low switching loss enables this embodiment to operate at very high switching frequency. If C1 and $L_F$ are large enough to render negligible any high-frequency AC rippling of voltage $V_{C1}$ and of input current $I_{IN}$ then as a function of $V_{OUT}$, $I_{IN}=[(1-D)^2(V_{CF}+N_{P/S}V_{OUT})]/2F_SL1\times[(V_{IN}+N_{P/S}V_{OUT}-V_{CF})/(2\ V_{CF}-V_{IN})]$, where $F_S$ is the switching frequency, and D is the duty cycle of the power switch, which is nearly constant over the line cycle. The concurrent increases in both $I_{IN}$ and $V_{IN}$ enable this design to achieve good power factor even with fixed frequency and fixed duty cycle control.

This FIG. 4 embodiment of my invention differs from the identified Teramoto (et al.) circuitry in several significant respects. First, the topology is different: Teramoto uses a high-frequency capacitor (C1) between what I call nodes P3 and M9; whereas I use a low-frequency DC-blocking capacitor (C1) in series with a high-frequency inductor (L1). Second, the circuit waveforms and the PFC mechanisms are different: C1 in Teramoto's circuitry is subject to large high-frequency voltage swings, and largely determines the input current waveform; whereas my C1 in FIG. 4 experiences mainly low-frequency ripple owing to my higher (about 100 times) C1 capacitance, and my FIG. 4 input waveform is determined mainly by L1. Third, as a result, principal diode D1 of Teramoto operates with hard switching, but with soft-switching in my FIG. 4—because of L1. Too, Teramoto's converter requires wide-range frequency modulation to accommodate desirably wide line and load ranges, but mine accommodates such ranges successfully with fixed frequency control Simulation of my FIG. 4 embodiment was performed via PSPICE® (MicroSim Corporation, Irvine, Calif.) Simulation Program with Integrated Circuit Emphasis, at $V_{IN}$ of 90–132 AC and 5 V/15A output.

Values of the circuit elements for this 75 W output follow:

S, IRF840; $L_F$, 2 mH; L1, 280 uH; C1, 0.39 uF; $C_F$, 100 uF/250 V; D1, MUR160; Np:Ns, 33:1; DR1, 62CNQ030. At fixed-frequency 100 kHz switching control, the converter tightly regulated the output voltage from no load to full load with line voltage in the range of 90–132 V AC. Over the entire line and load range $V_{CF}$ varies only within a small voltage range, from 170 V to 230 V. Overall efficiency of my FIG. 4 embodiment at full load is remarkably high, 80%.

With fixed frequency control, filter capacitor voltage $V_{CF}$ will vary as line voltage increases or load current decreases, so it may be desirable to lessen such variation, as by variable frequency control. For example, lessening control frequency $F_S$ appropriately as the output voltage decreases can hold $V_{CF}$ essentially constant.

To limit the voltage stress on $C_F$, output filter inductor $L_F$ should be sized so the converter operates in discontinuous mode at ½ to ⅔ load and at high line, so that duty cycle decreases as load current decreases, and $V_{CF}$ will not increase at high line with load-current at full to no load.

Figure 6A:
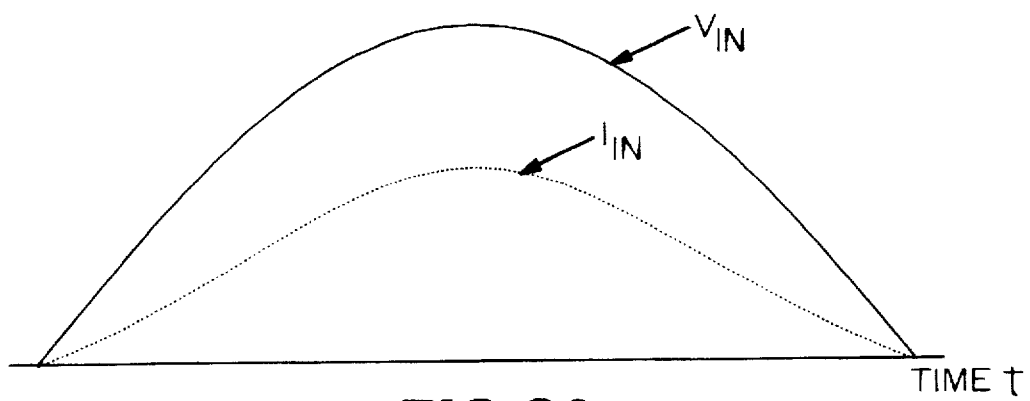
FIGS. 6A and 6B are graphical representations of calculated and simulated line voltage and current for the embodiment of FIG. 4.

FIG. 6A shows graphically the calculated line voltage and line current (based on the $I_{IN}$ equation) during on-line operation of the embodiment of FIG. 4, operating at 50% duty cycle. It shows close time congruence of $V_{IN}$ and $I_{IN}$ waveforms (power factor of 0.98) with imperceptible waveform degradation from true sinusoidal. The high-frequency ripple is ignored in this representation.

Figure 6B:
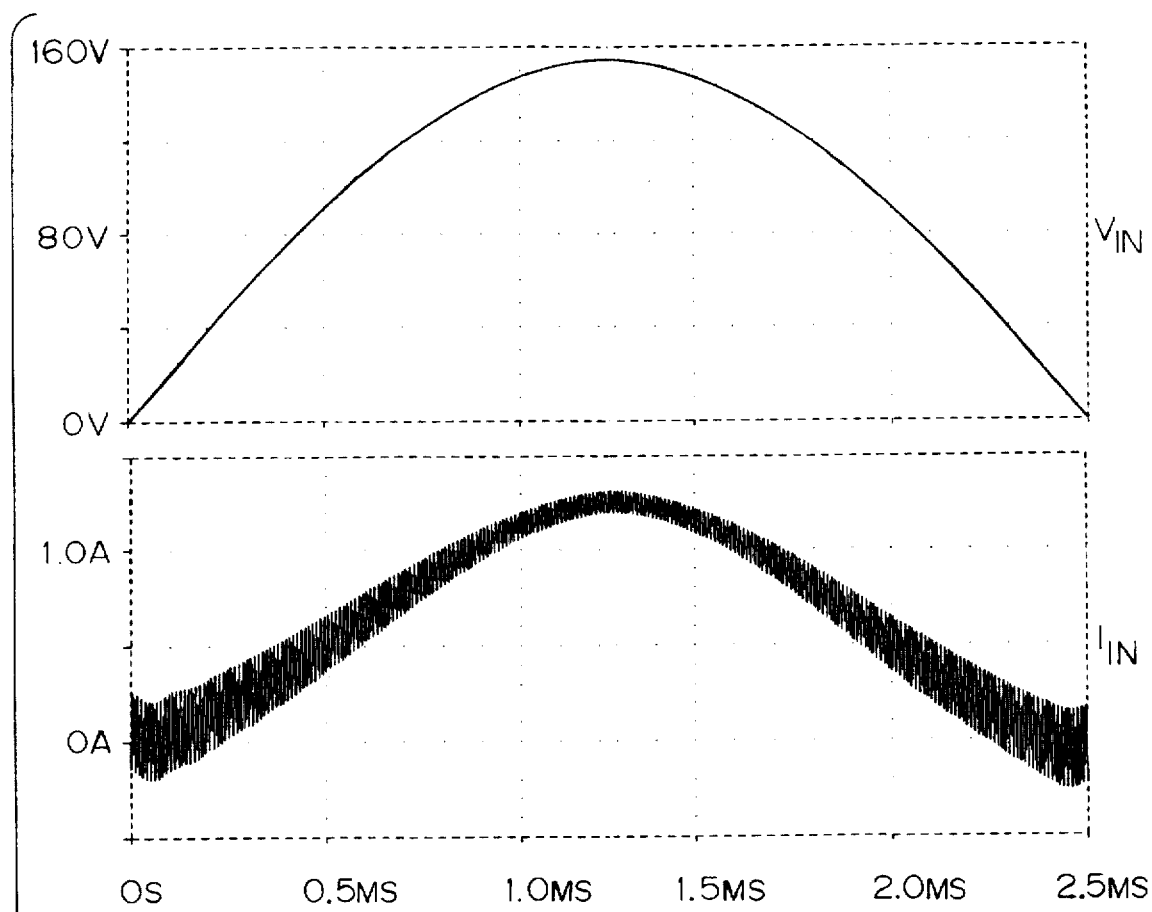

FIG. 6B shows simulated line voltage and resulting current, with the high frequency superimposed, at full load with only slight waveform degradation and a power factor of 0.97. As is apparent, the calculations and the simulation results are in good agreement.

The control circuit also can be implemented or supplemented by using a pulse width modulation (PWM) control IC circuitry. The duty cycle of the converter is controlled by sensing the output voltage to achieve tight output regulation and fast transient response.

More about PWM controlling of AC/DC power supplies is found in U.S. Pat. Nos 5,262,930 and 5,486,752 issued to the present inventor and Fred C. Lee as joint inventors.

Various embodiments of this invention appear in added diagrams. In the interest of conciseness, where components are unchanged they are not necessarily re-identified or even mentioned again, unless some change in function is noted. Similar non-identical components may be designated by single or double primes or change in subscript.

Figure 7:
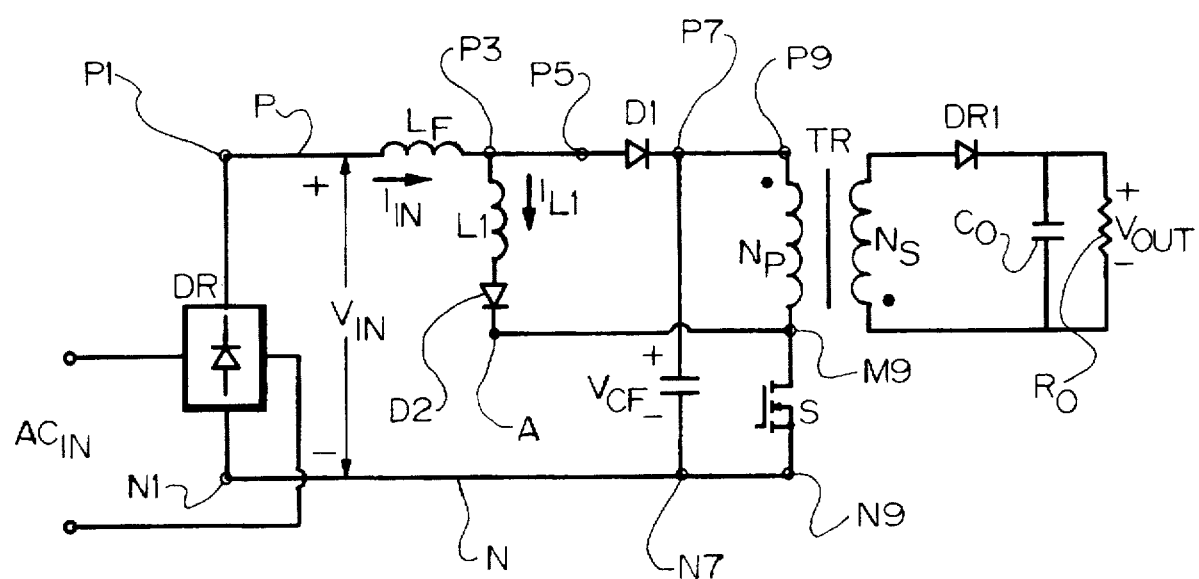
FIG. 7 is a detailed circuit diagram of a second embodiment of this invention also of flyback type corresponding to FIGS. 2 and 3B.

FIG. 7 shows a second embodiment of this invention, corresponding to the general type of FIG. 2, specifically the flyback type of FIG. 4, but now with FIG. 3B intermediate lead M2 containing further inductor L1, as before, but now followed by diode D2, from node P3 in the positive lead to node A and on to node M9 in the converter.

Figure 8:
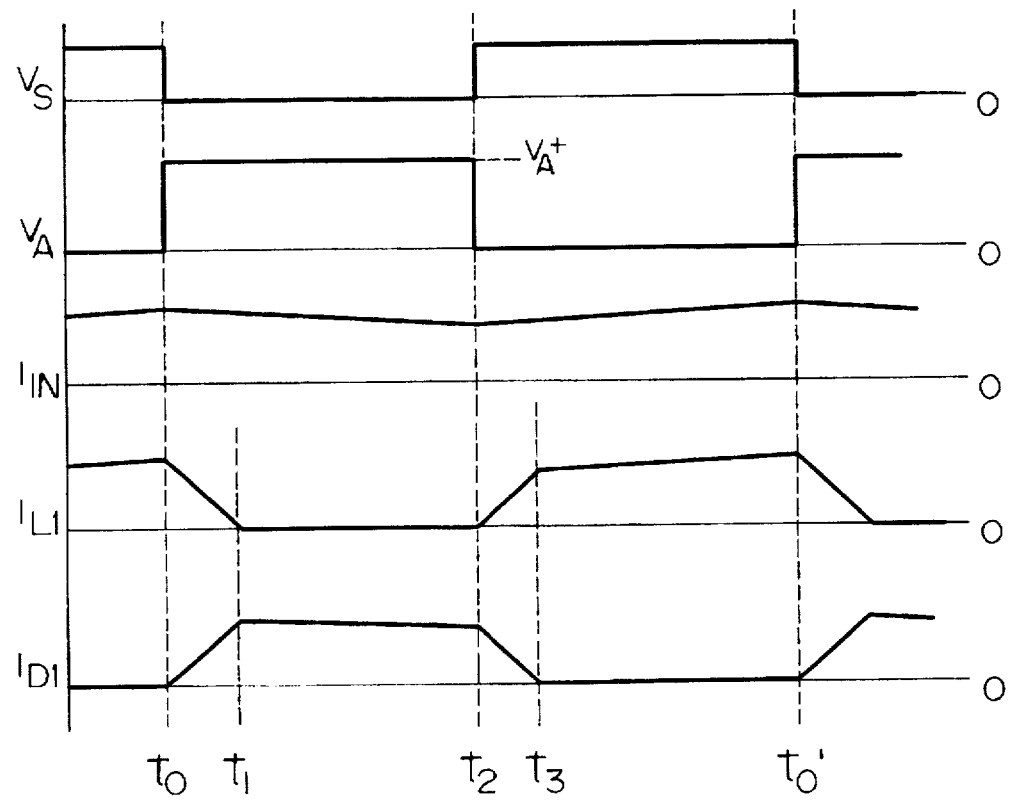
FIG. 8 is a graphical representation of internal operating voltages and currents in the FIG. 7 circuit over a switching cycle.

FIG. 8 shows graphically the internal operating voltages and currents of the FIG. 7 circuitry during operation, much as their counterparts appeared in FIG. 5 for the FIG. 4 embodiment. Only the significant differences are noted here. Mainly, whereas capacitor C1 accommodated current flow in either direction, diode D2 enables only forwardly directed flow, necessitating a new time designation t1as $I_{L1}$ reaches zero and $I_{D1}$ reaches its maximum, displacing prior time t1 to new time t2 and necessitating a new time designation, t3.

Therefore, in FIG. 8, four topologies are time-delimited, for the FIG. 7 embodiment, thus: [t0-t1], [t1-t2], [t2-t3] and [t3-t0'].

[t0-t1] Power switch S is switched OFF, dropping $V_S$ to zero, increasing $V_A$ rapidly as before; the current through the intermediate lead inductor, $I_{L1}$ falls off much as before, but now in accordance with conduction via diode D2 (in place of capacitor C1) and soon reaching zero, its lowest limit. $I_{D1}$ current through diode D1 rises to its peak accordingly in the same shorter time.

[t1-t2] $I_{L1}$ remains nil and $I_{D1}$ current diminishes slightly until S turns on again and drops $V_A$.

[t2-t3] $I_{L1}$ rises markedly, and $I_{D1}$ drops likewise to zero.

[t3-t0'] $I_{L1}$ rises slowly in accordance with the gradual rise in input line current $I_{IN}$.

As can be seen, one effect of the intermediate lead diode is to reduce the conduction loss and core loss in inductor L1 (due to lower r.m.s. current) as it conducts for a much shorter total time. This further increases the overall efficiency, but with a lessening of power factor to from about 0.85 to 0.95, as compared with the 0.95 to 0.99 of the previous or first embodiment.

This FIG. 7 embodiment of my invention differs from the identified Redl (et al.) circuitry in significant respects. First, the topology is different: Redl uses a diode between what I call nodes P3 and M9; whereas I use a diode (D2) in series with a high-frequency inductor (L1). Second, Redl's input filter inductor ($L_F$) has to operate in deep discontinuous mode to achieve PFC, requiring a bulky and costly large input EMI filter, and imposing very high peak and r.m.s. current stresses, decreasing efficiency; whereas my input filter inductor ($L_F$) can be operated in continuous conduction mode without losing PFC function—owing to my use of L1—and is operable in continuous conduction mode without losing PFC function and more efficiently than Redl's. My FIG. 7 converter thus provides advantages of performance and cost (efficiency, smaller size/weight) and is better suited for AC/DC applications at higher power levels.

Values for this embodiment follow: S, IRF840; $L_F$, 0.5 mH; L1, 330 uH; $C_F$, 100 uF/250 V; $N_P:N_S$=31:1; D1, D2, MUR160; DR1, 62CNQ030.

Figure 9:
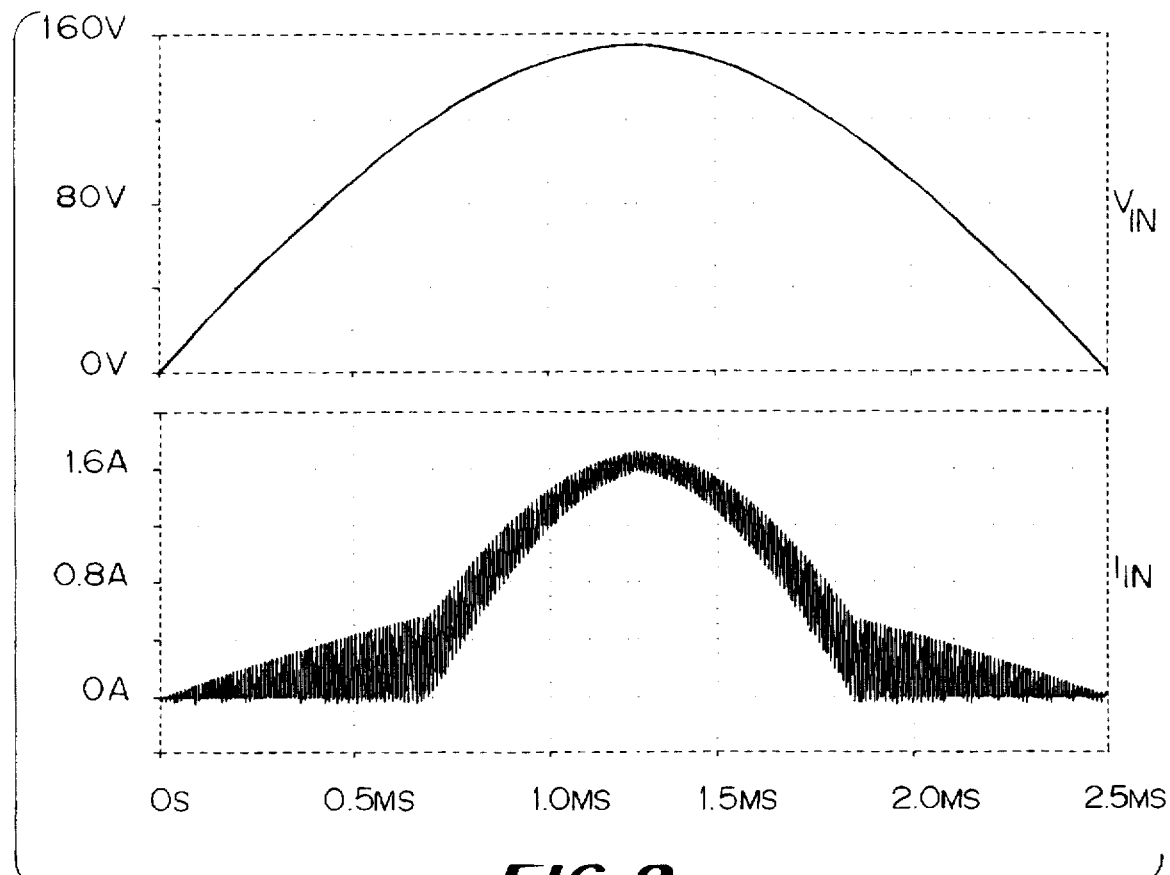
FIG. 9 is a graphical representation of simulated line voltage and filter inductor line current for the FIG. 7 second embodiment.

The PSPICE® program was also used to simulate FIG. 7 operation, and FIG. 9 shows corresponding input lead voltage $V_{IN}$ and current $I_{IN}$ (with the high frequency superimposed), at full load and 110 V $AC_{IN}$. The measured power factor is 0.92, which is lower than in the first embodiment under like conditions. However, circuit efficiency is increased about 2% in this second embodiment, to about 82%.

Figure 10:
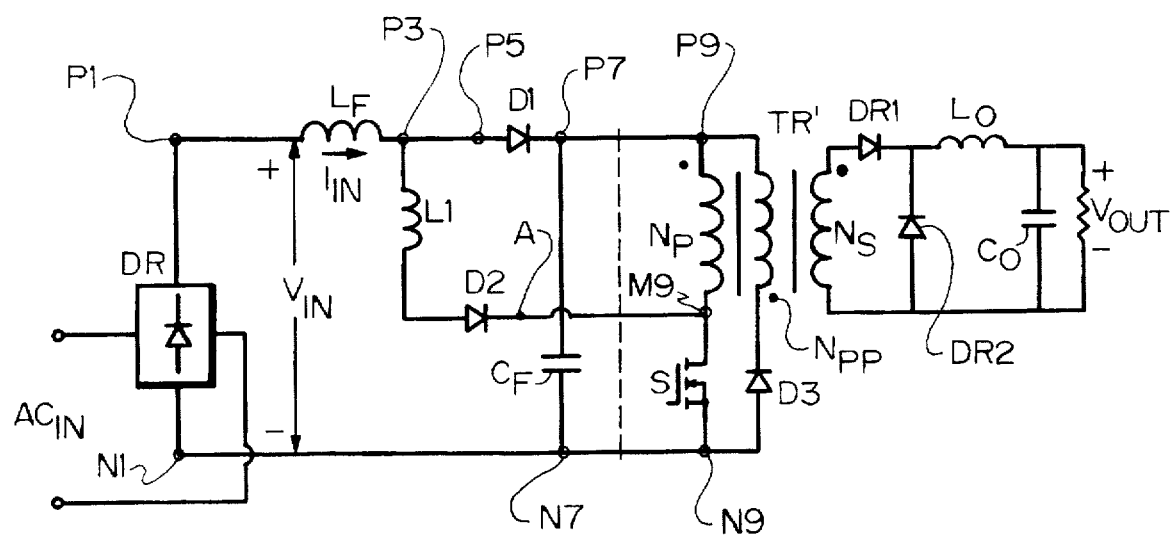
FIG. 10 is a detailed circuit diagram of a third embodiment of this invention, in a single-switch forward converter circuit.

FIG. 10 shows schematically a third embodiment of this invention, corresponding to FIGS. 2 and 3B, in a single-switch forward type of converter circuit. Alternatives, such as active clamp forward, or forward with current doubler rectifier, may be substituted. This embodiment includes intermediate lead M2 connecting to node M9 at the junction of high-frequency switch S and an end of primary winding $N_P$ of transformer TR'. This transformer also has both secondary winding $N_S$ and another primary, reset winding $N_{PP}$ (reverse wound) connected together with series diode D3 in parallel with the primary winding across input nodes N9, P9.

The converter circuitry here includes rectifying diode DR1 in the positive output lead, and output filter capacitor $C_O$ bridging both leads in parallel with output or load resistor $R_O$, as in the flyback converter, but also diode DR2 from the negative lead to the junction of DR1 and $L_O$, as is customary for a forward converter.

Figure 11:
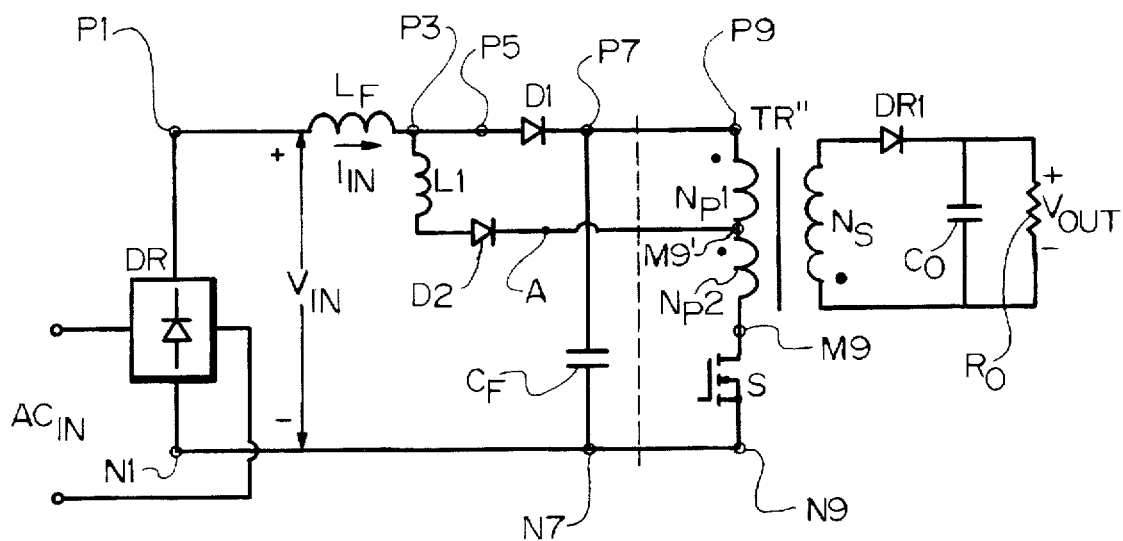
FIG. 11 is a detailed circuit diagram of a fourth embodiment of this invention, with the intermediate lead connecting to a primary winding tap of an otherwise conventional two-winding transformer.

FIG. 11 is a detailed circuit diagram of a fourth embodiment of this invention, corresponding to FIGS. 2 and 3B, differing from the FIG. 7 embodiment in connecting the intermediate lead to a primary winding tap of otherwise conventional two-winding transformer TR", at a node designated M9' to distinguish it from prior intermediate node P9 between a primary winding and high-frequency power switch S. The intercepted part of the primary is $N_{P2}$ of total primary $N_{P1}+N_{P2}$.

Figure 12:
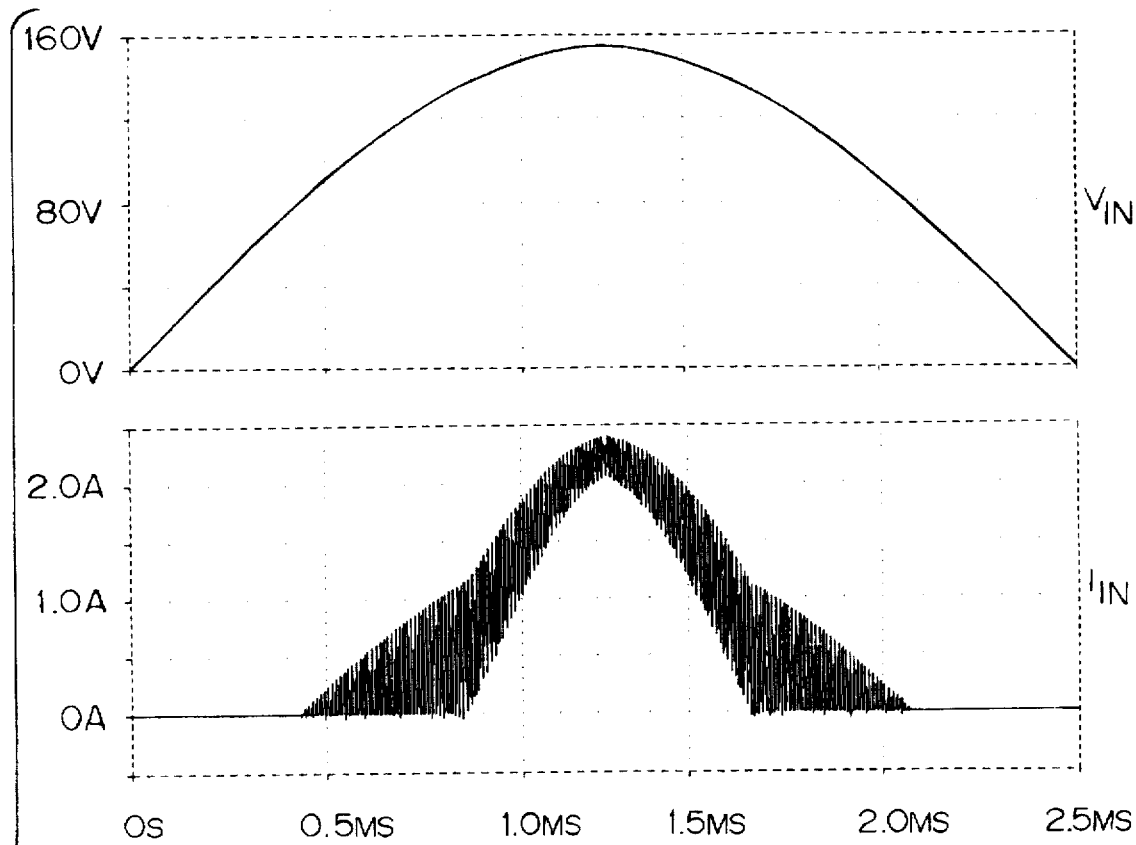
FIG. 12 is a graphical representation of simulated line voltage and filter inductor current obtained for the FIG. 11 embodiment.

FIG. 12 shows graphically input lead voltage $V_{IN}$ and current $I_{IN}$ simulated for this FIG. 11 fourth embodiment. The values used were: S, RF840; $L_F$, 100 uH; L1, 145 uH; $C_F$, 100 uF/250 V; $N_{P1}:N_{P2}:N_S$=14:14:1; D1, D2, MUR160; DR1, 62CNQ030. The resulting power factor is 0.83, and the efficiency is 83% at 110 V AC input.

Node P9' functions as a source of high-frequency AC much as node P9 at the junction of high-frequency control switch and primary winding did in previous embodiments. However, the intermediate lead effect differs because this embodiment undergoes less voltage swing at node A than in those embodiments. As a result, here the values of inductive circuit elements $L_F$ and L1 can be smaller. Moreover, as less current flows in the intermediate lead in this embodiment and the power factor is lower, power switch S is subject to lower peak and r.m.s. current stress in this tapped primary variant.

Both experimentation and simulation show that this converter can provide a power factor of about 0.85 at a center tap, i.e., when the number of turns in the respective parts of the tapped winding are equal. In general, the nearer tap node M9' is to the M9 node, the better the power factor but the more sacrifice in overall efficiency. The ability to trade off power factor and efficiency (power out vs. power in) enables optimization of the design for diverse end-uses. What is best depends upon a given designer's own constraints and objectives.

The termination of lead A may be from zero to about four-fifths of the transformer primary, as the designer may select. One-third is a preferred location for power factor and efficiency cost trade-off.

Figure 13:
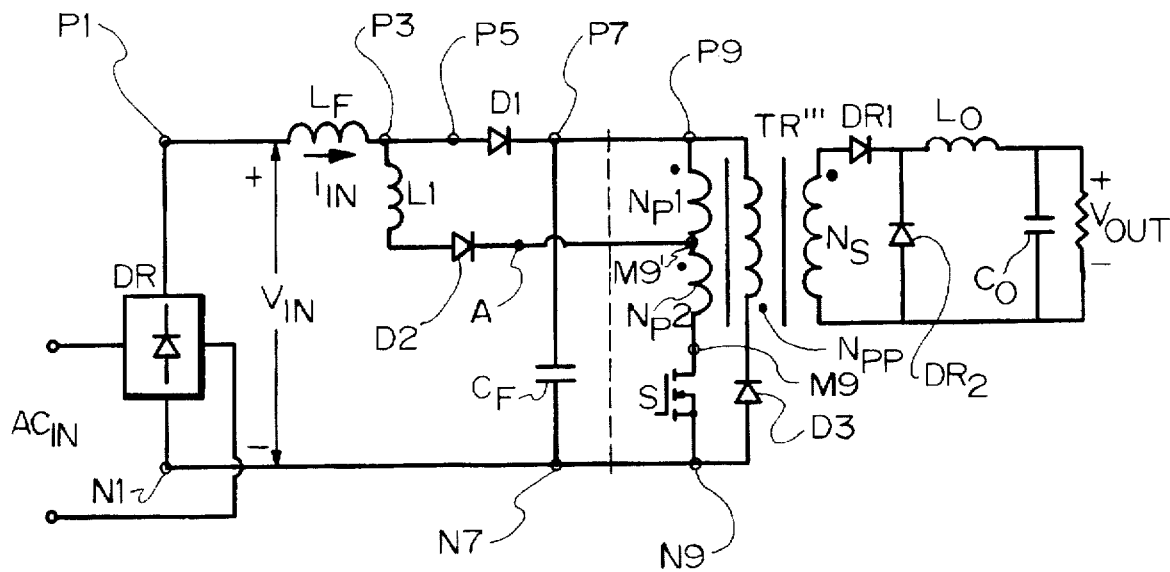
FIG. 13 is a detailed circuit diagram of a fifth embodiment of this invention, with the intermediate lead connecting to a tapped primary of a single-switch forward converter circuit.

FIG. 13 shows a detailed circuit diagram of a fifth embodiment of this invention corresponding to FIGS. 2 and 3B, like the third or FIG. 10 embodiment with single-switched forward converter in having a 3-winding transformer except (here TR''') with a tapped primary, as in the fourth or FIG. 11 embodiment (there a flyback converter). Again, the more the winding is intercepted by the intermediate lead, at position-adjusted node M9', the higher the efficiency but the lower the power factor. A circuit designer can optimize whichever of those and related economic factors is/are best for application.

Figure 14:
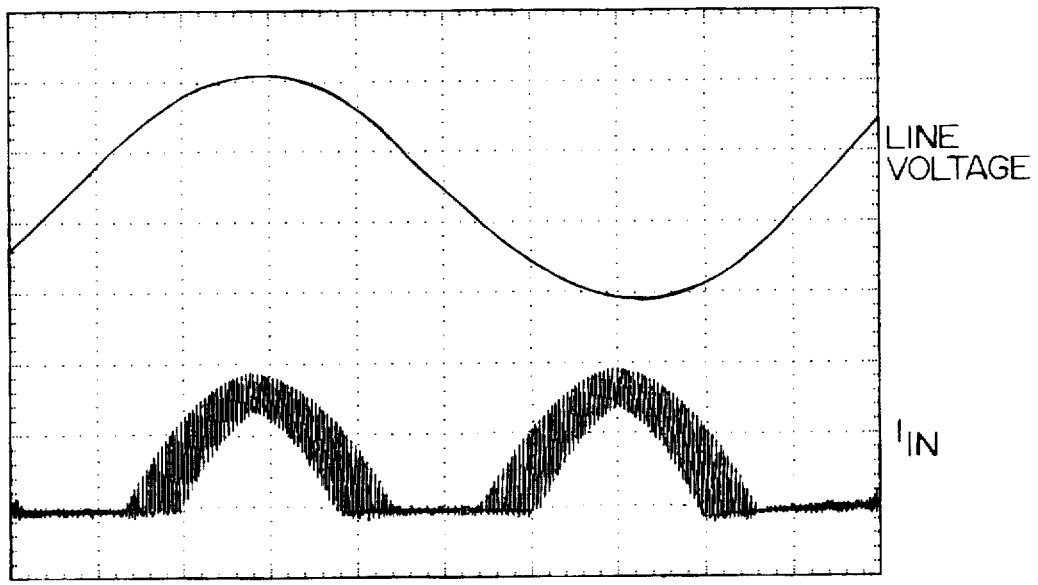
FIG. 14 is a graphical representation of experimental line voltage and filter inductor current for the FIG. 13 fifth embodiment.

FIG. 14 shows graphically actual experimental results obtained for input line voltage, $V_{IN}$, and filter inductor current, $I_{CF}$ with the FIG. 13 embodiment. The actual components were the following: S, IRF840; $L_F$, 100 uH; L1, 145 uH; $C_F$, 100 uF/250 V; $N_{P1}$, 26 turns; $N_{P2}$, 26 turns; $N_{PP}$, 52 turns; $N_S$, 18 turns; $L_O$, 40 uH; D1, D2, MUR160; DR1, DR2, 10CTQ150. The selected switching frequency was 100 kHz. This experimental converter can regulate 22 $V_{OUT}$ DC over a 0 to 3.2 A load range and a 90–132 $V_{IN}$ AC input range. At 110 V Ac input and full load, the measured circuit efficiency of the converter is about 88% and the power factor is 0.84. For comparison, $N_{P1}$ was increased to 52 turns, and $N_{P2}$ reduced to 0 turns, changing the configuration to that of FIG. 10, whereupon the power factor increased to 0.93, but the efficiency dropped to 86.8%.

This invention does not require any unusual components or other materials. The high-frequency switch may be a MOSFET (metal oxide semiconductor field effect transistor) or an IGBT (insulated gate bipolar transistor) or other suitable transistor configuration. All the components of the foregoing embodiments are readily available.

The foregoing new intermediate (or "PFC") leads M1 and M2 are supplemented by the M3 and M4 intermediate circuitry, wherein the inductor from the first two is relocated (put in the positive lead). These design variations typify further embodiments of my invention as advances over the more simplistic connections of the prior art.

Figure 15:
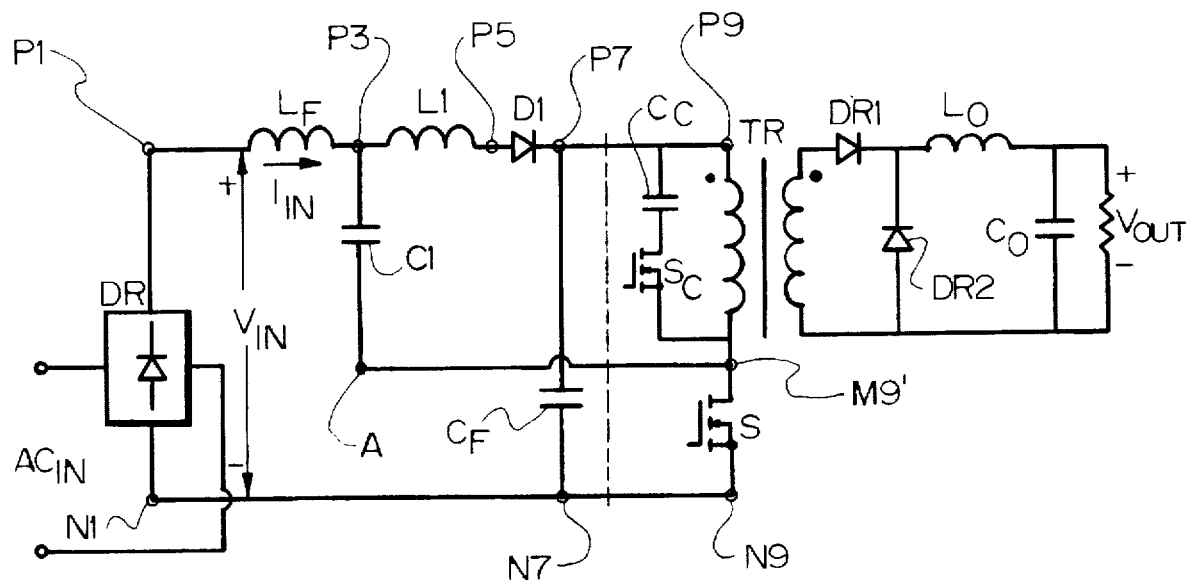
FIG. 15 is a semi-detailed circuit diagram of a sixth embodiment of this invention, corresponding to FIGS. 2 and 3C, also suited for any of the foregoing or other detailed converter circuitry.

FIG. 15 shows a sixth embodiment of this invention, corresponding to FIGS. 2 and 3C (an M3 type of intermediate lead). An active clamp forward DC/DC converter here replaces the reset winding of the forward converter of FIG. 10 with an added high-frequency switch $S_C$ and series capacitor $C_C$ together paralleling primary winding Switch $S_C$ is timed to conduct only while switch S is OFF.

This invention is analogously adapted for use with other DC/DC circuitry. See, for example, those illustrated in Tabisz and Lee U.S. Pat. No. 5,841,220, including on the sixth of eight sheets of drawings, basic designs in drawings designated FIGS. 10A-F and/or FIGS. 11A-F of the following converter types: buck, boost, buckboost; Cuk; Zeta, and SEPIC. See also a presentation of similar designs in the sixth sheet of eight sheets, FIG. 8, of previously mentioned U.S. Pat. No. 5,262,930.

Figure 16:
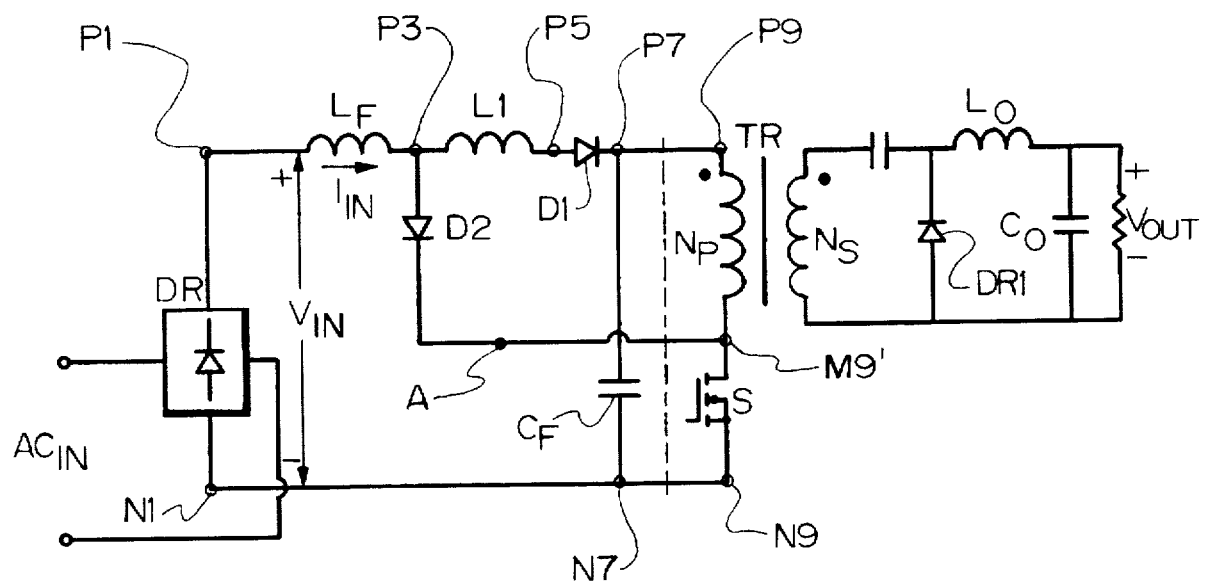
FIG. 16 is a semi-detailed circuit diagram of a seventh embodiment of this invention, corresponding to FIGS. 2 and 3D, also suited like FIG. 14 for any of the foregoing or other detailed converters.

FIG. 16 shows a seventh embodiment of this invention, also corresponding to FIGS. 2 and 3D (as FIG. 15 did) but with a Zeta DC/DC converter. In it, capacitor C is located in place of diode DR1 of the forward designs of FIGS. 10 and 15. The parallel diode in the DC/DC stage remains (but is renumbered here), with no other change.

Advantages of the illustrated and described embodiments of this invention have been mentioned, and others will doubtless accrue to persons undertaking to make or use such AC/DC power supplies, which may take other forms while retaining one of the intermediate leads by which the full capabilities of a particular design are realized.

It is feasible to apply the design principles and practices described and shown here to provide a comparable family of AC/AC inverters with good power factor and regulation, as will be apparent.

The foregoing text may have included verbally or mathematically stated rationales by way of theoretical explanations for practical utility of the present invention, but practitioners of the described invention may practice it satisfactorily regardless of whether they understand or agree with such rationales, or whether my theories about how or why the invention works are accurate or not.

The circuit technology described here may be extended to make consolidated or single-stage AC/AC converters, as by replacing the DC/DC stage by a DC/AC inverter, with resulting good power factor and tight regulation, for such uses as electronic ballast circuitry, for example.

Preferred embodiments and variants have been suggested for this invention. As noted, other modifications may be made, as by adding, combining, deleting, or subdividing compositions, parts, or steps, while retaining all or some of the advantages and benefits of the present invention—which itself is defined in the following claims.

I claim:

1. An AC/DC converter comprising
   AC/DC rectifier circuitry having a pair of AC input terminals, and DC/DC converter circuitry having a pair of DC output terminals, interconnected by a pair of respectively positive and negative (or neutral) leads each functioning as an output lead from the rectifier circuitry and as an input lead to the converter circuitry, which itself is subjected to only a single high-frequency power switch;
   wherein the positive lead as a rectifier output lead contains a filter inductor then as a converter input lead contains a diode, and a bridging positive-to-negative lead contains a smoothing filter capacitor and connects it from the converter input end of the positive lead to the negative lead; and
   intermediate circuitry including (a) an intermediate lead connected from between the filter inductor and the diode to a high-frequency AC voltage source in the DC/DC converter circuitry, and (b) a further inductor connected in series (i) from the junction of the positive and intermediate leads to the diode in the positive lead, or (ii) with a DC-blocking element in the intermediate lead.

2. The AC/DC converter according to claim 1, wherein the DC-blocking circuit element comprises a capacitor.

3. The AC/DC converter according to claim 1, wherein the DC-blocking circuit element comprises a further diode.

4. The AC/DC converter according to claim 1, wherein the intermediate input lead to the converter circuitry connects to the power switch as such AC source.

5. The AC/DC converter according to claim 4, wherein the converter circuitry includes an isolation transformer with primary winding connected across the positive and intermediate input leads.

6. The AC/DC converter according to claim 5, wherein the converter circuitry is of flyback type.

7. The AC/DC converter according to claim 5, wherein the converter circuitry is of forward type.

8. The AC/DC converter according to claim 5, wherein the primary winding is tapped intermediate its ends, and the intermediate input lead to the converter circuitry connects to that intermediate tap of the primary winding as such AC source.

9. The AC/DC converter according to claim 8, wherein the converter circuitry is of flyback type.

10. The AC/DC converter according to claim 8, wherein the converter circuitry is of forward type.

11. AC/DC converter according to claim 10, wherein the transformer has, besides its primary winding a reverse-wound second winding in series connection from the negative lead through a diode to the positive lead as a reset winding.

12. In an AC/DC single stage converter having AC/DC rectifier circuitry connected to DC/DC converter circuitry by respective positive and negative (or neutral) leads functioning as rectifier output leads and also as converter input leads, the positive lead containing a filter inductor at the rectifier output followed in series by a diode toward the converter input, and having also a bridging lead connecting a smoothing filter capacitor across the positive and negative leads at the converter input;
   the improvement comprising
      an intermediate lead, connecting from a node on the positive lead intermediate the filter inductor and the diode to a node in the converter circuitry operative as a high-frequency AC source, and containing a further inductor followed by a DC-blocker selected with the further inductor to obtain acceptable power factor, r.m.s losses, output voltage regulation, or overall operating efficiency.

13. Improvement in an AC/DC converter according to claim 12, wherein the intermediate lead connects in the converter circuitry to a junction of (i) the drain of a power switch having its source connected to the the negative input lead, and (ii) one end of a primary winding of an isolation transformer having its other end connected to the positive input lead.

14. Improvement in an AC/DC converter according to claim 12, wherein the converter circuitry includes an isolation transformer having a primary winding with one end connected to the positive input lead, and wherein the intermediate lead connects to the primary winding at a tap located a distance measurable in turns up to as much as about 85 percent of the length from its other end.

15. Improvement in an AC/DC converter according to claim 14, wherein the tap to which the intermediate lead connects is located at about one third of the primary winding from the other end.

16. AC/DC converter according to claim 12, wherein the converter circuitry is one of the following types: boost, buck, buck-boost, Cuk, flyback, forward, SEPIC, Zeta.

* * * * *